(12) United States Patent
Shifren et al.

(10) Patent No.: US 11,636,316 B2
(45) Date of Patent: Apr. 25, 2023

(54) CORRELATED ELECTRON SWITCH ELEMENTS FOR BRAIN-BASED COMPUTING

(71) Applicant: Cerfe Labs, Inc., Austin, TX (US)

(72) Inventors: Lucian Shifren, San Jose, CA (US);
Shidhartha Das, Upper Cambourne (GB); Naveen Suda, San Jose, CA (US); Carlos Alberto Paz de Araujo, Colorado Springs, CO (US)

(73) Assignee: Cerfe Labs, Inc., Austin, TX (US)

( * ) Notice: Subject to any disclaimer, the term of this patent is extended or adjusted under 35 U.S.C. 154(b) by 1387 days.

(21) Appl. No.: 15/884,612

(22) Filed: Jan. 31, 2018

(65) Prior Publication Data
US 2019/0236441 A1    Aug. 1, 2019

(51) Int. Cl.
*G06N 3/04*    (2006.01)
*G06N 3/063*   (2006.01)
*G06N 3/049*   (2023.01)

(52) U.S. Cl.
CPC ........... *G06N 3/0481* (2013.01); *G06N 3/049* (2013.01); *G06N 3/0635* (2013.01)

(58) Field of Classification Search
CPC ..... G06N 3/0481; G06N 3/049; G06N 3/0635
USPC ........................................................ 706/27
See application file for complete search history.

(56) References Cited

U.S. PATENT DOCUMENTS

| | | | |
|---|---|---|---|
| 5,155,802 A * | 10/1992 | Mueller | ................. G06N 3/063 706/39 |
| 9,548,118 B1 | 1/2017 | Bhavnagarwala et al. | |
| 9,589,636 B1 | 3/2017 | Bhavnagarwala | |
| 9,621,161 B1 * | 4/2017 | Das | ................. H03K 19/00323 |
| 9,627,615 B1 | 4/2017 | Reid | |
| 9,660,189 B1 | 5/2017 | Reid | |
| 9,735,360 B2 | 8/2017 | Shifren | |
| 9,773,550 B2 | 9/2017 | Bhavnagarwala | |
| 10,002,665 B1 | 6/2018 | Bhargava et al. | |
| 10,002,669 B1 | 6/2018 | Bhargava et al. | |
| 10,922,608 B2 | 2/2021 | Suda et al. | |
| 2002/0181799 A1 * | 12/2002 | Matsugu | ............ G06K 9/00281 382/260 |
| 2008/0106925 A1 | 5/2008 | Paz de Araujo | |

(Continued)

FOREIGN PATENT DOCUMENTS

| | | |
|---|---|---|
| CN | 110383301 A | 10/2019 |
| CN | 111771214 A | 10/2020 |

(Continued)

OTHER PUBLICATIONS

Shin, et al., "Memristor-Based Fine Resolution Programmable Resistance and Its Application", 2009 International Conference on Communications, Circuits and Systems, Jul. 23-25, 2009 (Year: 2009).*

(Continued)

*Primary Examiner* — George Giroux
(74) *Attorney, Agent, or Firm* — Berkeley Law Technology

(57) ABSTRACT

Broadly speaking, the present techniques exploit the properties of correlated electron materials for artificial neural networks and neuromorphic computing. In particular, the present techniques provide apparatuses/devices that comprise at least one correlated electron switch (CES) element and which may be used as, or to form, an artificial neuron or an artificial synapse.

21 Claims, 7 Drawing Sheets

(56) References Cited

U.S. PATENT DOCUMENTS

| | | |
|---|---|---|
| 2008/0106926 A1 | 5/2008 | Brubaker |
| 2008/0106927 A1 | 5/2008 | Celinska |
| 2008/0107801 A1 | 5/2008 | Celinska |
| 2009/0104756 A1 | 4/2009 | Kumar |
| 2010/0207093 A1 | 8/2010 | Inoue et al. |
| 2010/0237317 A1 | 9/2010 | Tsunoda |
| 2012/0011092 A1 | 1/2012 | Tang et al. |
| 2012/0113706 A1 | 5/2012 | Stanley et al. |
| 2013/0094276 A1 | 4/2013 | Torsi |
| 2013/0248801 A1 | 9/2013 | Yamamoto |
| 2014/0113428 A1 | 4/2014 | Lin et al. |
| 2014/0187016 A1 | 7/2014 | Malhotra et al. |
| 2014/0231743 A1 | 8/2014 | Ramaswamy et al. |
| 2014/0301127 A1 | 10/2014 | Kim et al. |
| 2015/0129816 A1 | 5/2015 | Wang |
| 2015/0188048 A1 | 7/2015 | Wang et al. |
| 2016/0103332 A1 | 5/2016 | Nagey |
| 2017/0033782 A1* | 2/2017 | Shifren ............. G11C 13/0097 |
| 2017/0092858 A1 | 3/2017 | Shifren |
| 2017/0117043 A1 | 4/2017 | Sandhu |
| 2017/0147207 A1 | 5/2017 | Hansson |
| 2018/0095114 A1* | 4/2018 | Bhargave ............... G01R 27/02 |
| 2018/0260696 A1* | 9/2018 | Suda ....................... G06N 3/049 |

FOREIGN PATENT DOCUMENTS

| | | |
|---|---|---|
| KR | 20190120253 A | 10/2019 |
| TW | 201941113 A | 10/2019 |
| WO | WO1009140305 | 11/2009 |
| WO | WO2017/239972 | 8/2017 |
| WO | 2018007783 A1 | 1/2018 |
| WO | 2018162874 A1 | 9/2018 |
| WO | 2019150073 A1 | 8/2019 |

OTHER PUBLICATIONS

Gao, et al., "Tetris: Scalable and Efficient Neural Network Acceleration with 3D Memory", ASPLOS'17, Apr. 2017, pp. 751-764 (Year: 2017).*

Choi et al., "An electrically modifiable synapse array of resistive switching memory", Nanotechnology 20 (2009) 345201, 2009 (Year : 2009).*

Dean et al. (A VLSI Design for Neuromorphic Computing, Jul. 2016, pp. 87-92) (Year: 2016).*

Wang et al. (3D Synaptic Architecture with Ultralow sub-10 fJ Energy per Spike for Neuromorphic Computation, Dec. 2014, pp. 1-4) (Year: 2014).*

Zhou et al. (Mott Memory and Neuromorphic Devices, Jun. 2015, pp. 1289-1310) (Year: 2015).*

Ha, Sieu D., Jian Shi, Yasmine Meroz, L. Mahadevan and Shriram Ramanathan. "Neuromimetic Circuits with Synaptic Devices based on Strongly Correlated Electron Systems." Physcial Review Applied, vol. 2, No. 6, Dec. 1, 2014.

Ignatov Marina, Ziegler Martin, Hansen Mirko, Petraru Adrian, Kohlstedt Hermann, "A memristive spiking neuron with firing rate coding," Frontiers in Neuroscience, vol. 9, Oct. 20, 2015.

Pantazi, Angeliki & Wozniak, Stanislaw & Tuma, Tomas & Eleftheriou, Evangelos, "All-memristive neuromorphic computing with level-tuned neurons." Nanotechnology. 27, No. 35, Jul. 26, 2016.

Tuma, Tomas, Angeliki Pantazi, Manuel Le Gallo, Abu Sebastian and Evangelos Eleftheriou. "Stochastic phase-change neurons." Nature nanotechnology, vol. 11, No. 8, May 16, 2016.

International Search Report and Written Opinion dated Apr. 17, 2019 in WO Application No. PCT/GB2019/050080, 12 pages.

International Preliminary Report on Patentability dated Aug. 4, 2020 in WO Application No. PCT/GB2019/050080, 9 pages.

Request for Examination filed Jan. 26, 2021 in CN Application No. 201980015833.6, 2 pages.

Notification of Entering the Substantive Examination Phase dated Feb. 1, 2021 in CN Application No. 201980015833.6, 2 pages.

Patent Application filed Mar. 8, 2017 for U.S. Appl. No. 15/452,792, 86 pages.

Filing Receipt dated Mar. 16, 2017 in U.S. Appl. No. 15/452,792, 5 pages.

Information Disclosure Statement filed Jun. 14, 2018 in U.S. Appl. No. 15/452,792, 4 pages.

Notice of Publication dated Sep. 13, 2018 in U.S. Appl. No. 15/452,792, 1 page.

Non-Final Office Action dated Jun. 11, 2020 in U.S. Appl. No. 15/452,792, 16 pages.

Response to Non-Final Office Action filed Sep. 11, 2020 in U.S. Appl. No. 15/452,792, 13 pages.

Notice of Allowance dated Oct. 15, 2020 in U.S. Appl. No. 15/452,792, 10 pages.

Issue Fee Payment filed Jan. 11, 2021 in U.S. Appl. No. 15/452,792, 3 pages.

Issue Notification dated Jan. 27, 2021 in U.S. Appl. No. 15/452,792, 1 page.

International Search Report and Written Opinion dated May 24, 2018 in WO Application No. PCT/GB2018/050389, 11 pages.

International Preliminary Report on Patentability dated Sep. 10, 2019 in WO Application No. PCT/GB2018/050389, 8 pages.

Request for Examination filed Dec. 17, 2020 in KR Application No. 10-2019-7026923, 2 pages.

Amendment filed Dec. 17, 2020 in KR Application No. 10-2019-7026923, 8 pages.

Non-Final Office Action dated Sep. 29, 2017 in U.S. Appl. No. 15/591,708, 16 pages.

Response to Non-Final Office Action filed Dec. 21, 2017 in U.S. Appl. No. 15/591,708, 18 pages.

Jang, Jun-Woo, "Scalable Neuron Circuit Using Conductive-Bridge RAM for Pattern Reconstructions." IEEE Transactions on Electron Devices, vol. 63, No. 6, Jun. 2016, 4 pages.

Al-Shedivat, Maruan, "Memristors Empower Spiking Neurons With Stochasticity." IEEE Journal on Emerging and Selected Topics in Circuits and Systems, vol. 5, No. 2, Jun. 2015, 12 pages.

Afshar, Saeed, "Emergence of Competitive Control in a Memristor-Based Neuromorphic Circuit." IEEE World Congress on Computations Intelligence, Jun. 10-15, 2012, 8 pages.

Translation of Official Letter dated May 30, 2022 in TW Application No. 108102231, 7 pages.

* cited by examiner

200

201
202
203

210

CORRELATED ELECTRON SWITCH ELEMENTS FOR BRAIN-BASED COMPUTING

FIELD OF THE INVENTION

The present techniques generally relate to the use of correlated electron switch (CES) elements for brain-based computing, and in particular, to forming synapses and neurons for artificial neural networks from CES elements.

BACKGROUND

A correlated electron switch (CES) element is formed (wholly or in part) from a correlated electron material (CEM), which exhibits an abrupt conductive or insulative state transition arising from electron correlations rather than solid state structural phase changes. CES elements are a type of non-volatile memory, i.e. CES elements do not lose their state after power supplied to the CES elements is removed.

SUMMARY

According to a first approach of the present techniques, there is provided an apparatus for an artificial neural network, the apparatus capable of functioning as a synapse or as a neuron, and comprising at least one correlated electron switch (CES) element capable of: storing synaptic weights; operating in a high impedance state; operating in one of a plurality of low impedance states; a fast transition into a high impedance state when a reset condition occurs; a fast transition into one of a plurality of low impedance states when a set condition occurs; accumulating currents input into the apparatus as an accumulated current and outputting a signal when the accumulated current equals or exceeds a threshold current; and accumulating voltages input into the apparatus as an accumulated voltage and outputting a signal when the accumulated voltage equals or exceeds a threshold voltage.

According to a second approach of the present techniques, there is provided an apparatus for an artificial neural network, the apparatus comprising a synapse provided by at least one correlated electron switch (CES) element, wherein the synapse is capable of: storing synaptic weights; operating in a high impedance state; and operating in one of a plurality of low impedance states.

According to a third approach of the present techniques, there is provided an apparatus for an artificial neural network, the apparatus comprising a neuron provided by at least one correlated electron switch (CES) element, wherein the neuron is capable of: a fast transition into a high impedance state when a reset condition occurs; a fast transition into one of a plurality of low impedance states when a set condition occurs; accumulating currents input into the neuron as an accumulated current and outputting a signal when the accumulated current equals or exceeds a threshold current; and accumulating voltages input into the apparatus as an accumulated voltage and outputting a signal when the accumulated voltage equals or exceeds a threshold voltage.

The present techniques also relate to the use of any apparatus described herein as a synapse in an artificial neural network.

The present techniques also relate to the use of any apparatus described herein as a neuron in an artificial neural network.

A crosspoint array for an artificial neural network is described, wherein the crosspoint array comprises at least one of any type of apparatus described herein.

A multi-layer crosspoint array for an artificial neural network is described, wherein the crosspoint array comprises at least one of any type of apparatus described herein.

According to a further approach of the present techniques, there is provided a configurable array for an artificial neural network, the configurable array comprising: a plurality of apparatuses, each apparatus comprising at least one correlated electron switch (CES) element capable of functioning as a synapse or as a neuron; and a switching mechanism to switch the function of the at least one CES element in each of the plurality of apparatuses.

According to a further approach of the present techniques, there is provided a three-dimensional (3D) configurable array comprising: at least two layers, each layer comprising an array of apparatuses as recited in claim 10, wherein the layers are arranged in a stack; and electrical coupling between adjacent layers of the in the stack; wherein a size of the 3D array is adjustable by disconnecting or connecting layers of the stack.

BRIEF DESCRIPTION OF THE DRAWINGS

The techniques are diagrammatically illustrated, by way of example, in the accompanying drawings, in which.

DETAILED DESCRIPTION

Figure 1:
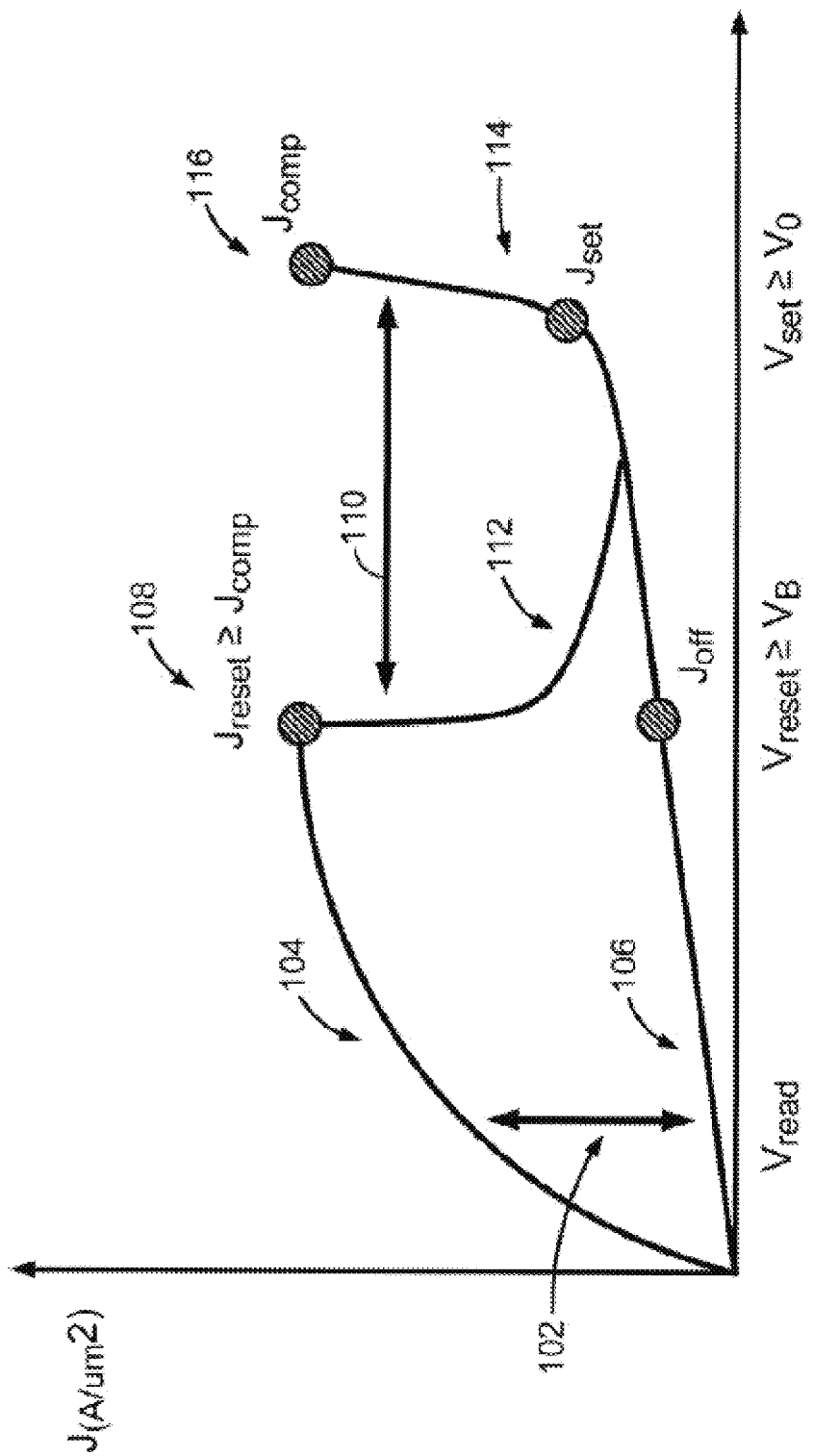
FIG. 1 shows an example plot of current density against voltage for a correlated electron switch (CES) element.

Broadly speaking, the present techniques exploit the properties of correlated electron materials for artificial neural networks and neuromorphic computing. In particular, the present techniques provide apparatuses/devices that comprise at least one correlated electron switch (CES) element and may be used as, or to form, an artificial neuron or an artificial synapse. Embodiments provide a device (comprising at least one CES element), which may be capable of being configured to provide either an artificial neuron or an artificial synapse.

An artificial neuron which comprises at least one CES element may perform substantially the same functions as biological neurons. The artificial neuron therefore, receives one or more electrical inputs (e.g. voltage or current) and sums them to produce an output (also known as an action potential). In embodiments, an output is only produced when the sum of the inputs reaches or exceeds a threshold value (e.g. a specific voltage or current value).

An artificial synapse which comprises at least one CES element may perform substantially the same functions as biological synapses. The artificial synapse may therefore, couple together two artificial neurons such that signals may be transmitted between the neurons. The artificial synapse may enable a synaptic current to flow between the neurons, where the synaptic current is dependent on or resultant from the output of the neurons. In embodiments, the artificial synapse may comprise weights, or implement weighting functions, such that the outputs of one neuron are weighted by the synapse before being sent as inputs into another neuron. The synaptic weights may be adjustable, such that information which flows through an artificial neural network may be altered. For example, the synaptic weights may be used to alter the strength or magnitude of signals outputted by one neuron before the signals are received as inputs by another neuron. The synaptic weights may be applied by an artificial synapse by using at least one CES element to adjust the strength of the signal received by the synapse.

The apparatuses/devices of the present techniques each comprise at least one correlated electron switch (CES) element to perform the functions of a synapse and/or a neuron. For example, an apparatus comprising at least one CES element may be able to store a threshold value (e.g. a threshold current or voltage) for a neuron. The neuron may then fire (or produce an output) when the current accumulated in the neuron equals or exceeds the stored threshold value. In another example, an apparatus comprising at least one CES element may be able to store a synaptic weight, to weight the outputs of neurons before they are provided as inputs to other neurons. These functions are enabled because of the properties of CES elements. Generally speaking, each CES element is switchable between an insulative state (or high impedance state) and at least one conductive state (or low impedance state). A CES element may be switched into one of a plurality of low impedance states depending on the compliance current applied to the CES element. Thus, varying the compliance current applied to a CES element may enable the CES element to be set into a specific low impedance state. As a result, the CES element may be able to store a specific threshold current (or voltage) for an artificial neuron, or store a specific weight for an artificial synapse.

The term "correlated electron switch" is used interchangeably herein with "CES", "CES element", "CES device", "correlated electron random access memory", "CeRAM", "CeRAM device", and "CeRAM element".

A CES element is a particular type of switch formed (wholly or in part) from a correlated electron material (CEM). Generally speaking, a CES may exhibit an abrupt conductive or insulative state transition arising from electron correlations rather than solid state structural phase changes. (Examples of solid state structural phase changes include crystalline/amorphous in phase change memory (PCM) devices, or filamentary formation and conduction in resistive RAM devices, as discussed above). An abrupt conductor/insulator transition in a CES may be responsive to a quantum mechanical phenomenon, in contrast to melting/solidification or filament formation.

A quantum mechanical transition of a CES between an insulative state and a conductive state may be understood in terms of a Mott transition. In a Mott transition, a material may switch from an insulative state to a conductive state if a Mott transition condition occurs. When a critical carrier concentration is achieved such that a Mott criteria is met, the Mott transition will occur and the state will change from high resistance/impedance (or capacitance) to low resistance/impedance (or capacitance).

A "state" or "memory state" of the CES element may be dependent on the impedance state or conductive state of the CES element. In this context, the "state" or "memory state" means a detectable state of a memory device that is indicative of a value, symbol, parameter or condition, just to provide a few examples. In one particular implementation, as described below, a memory state of a memory device may be detected based, at least in part, on a signal detected on terminals of the memory device in a read operation. In another particular implementation, as described below, a memory device may be placed in a particular memory state to represent or store a particular value, symbol or parameter by application of one or more signals across terminals of the memory device in a "write operation."

In a particular implementation, a CES element may comprise material sandwiched between conductive terminals. By applying a specific voltage and current between the terminals, the material may transition between the aforementioned conductive and insulative states. As discussed in the particular example implementations below, material of a CES element sandwiched between conductive terminals may be placed in an insulative state by application of a first programming signal across the terminals having a voltage $V_{reset}$ and current $I_{reset}$ at a current density $J_{reset}$, or placed in a conductive state by application of a second programming signal across the terminals having a voltage $V_{set}$ and current $I_{set}$ at current density $J_{set}$.

Additionally or alternatively, a CES element may be provided as a memory cell in a cross-point memory array whereby the CES element may comprise a metal/CEM/metal (M/CEM/M) stack formed on a semiconductor. Such an M/CEM/M stack may be formed on a diode, for example. In example implementations, such a diode may be selected from the group consisting of a junction diode and a Schottky diode. In this context, it should be understood that "metal" means a conductor, that is, any material that acts like a metal, including, for example, polysilicon or a doped semiconductor.

FIG. 1 shows an example plot of current density against voltage across terminals (not shown) of a correlated electron switch (CES) element. Based, at least in part, on a voltage applied to terminals of the CES element (e.g., in a write operation), the CES may be placed in a conductive state or an insulative state. For example, application of a voltage $V_{set}$ and current density $J_{set}$ may place the CES element in a conductive memory state and application of a voltage $V_{reset}$ and a current density $J_{reset}$ may place the CES element in an insulative memory state.

Following placement of the CES in an insulative state or conductive state, the particular state of the CES element may be detected by application of a voltage $V_{read}$ (e.g., in a read operation) and detection of, for example, a current or current density at terminals or bias across the terminals of the CES element.

Both the current and the voltage of the CES element need to be controlled in order to switch the CES element state. For example, if the CES element is in a conductive state, and voltage $V_{reset}$, required to place the device in an insulative memory state, is applied thereto, the CES element will not switch into the insulative state until the current density is also at the required value of $J_{reset}$. This means that, when the CES element is used to read/write from a memory, unintended rewrites may be prevented since even if sufficient voltage is applied to the CES element, a memory state change will only occur if the required current density is also applied.

The CES element may include any transition metal oxide (TMO), such as, for example, perovskites, Mott insulators, charge exchange insulators, and Anderson disorder insulators. In particular implementations, a CES element may be formed from switching materials such as nickel oxide, cobalt oxide, iron oxide, yttrium oxide, and perovskites such as Cr doped strontium titanate, lanthanum titanate, and the manganate family including praesydium calcium manganate, and praesydium lanthanum manganite, just to provide a few examples. In particular, oxides incorporating elements with incomplete d and f orbital shells may exhibit sufficient resistive switching properties for use in a CES device. In an embodiment, a CES element may be prepared without electroforming. Other implementations may employ other transition metal compounds without deviating from claimed subject matter. For example, {M(chxn)2Br}Br2 where M may comprise Pt, Pd, or Ni, and chxn comprises 1R,2R-cyclohexanediamine, and other such metal complexes may be used without deviating from claimed subject matter.

When sufficient bias is applied (e.g., exceeding a band-splitting potential) and the aforementioned Mott condition is met (injected electron holes=the electrons in a switching region), the CES element may rapidly switch from a conductive state to an insulative state via the Mott transition. This may occur at point 108 of the plot in FIG. 1. At this point, electrons are no longer screened and become localized. This correlation may result in a strong electron-electron interaction potential which splits the bands to form an insulator. While the CES element is still in the insulative state, current may be generated by transportation of electron holes. When sufficient bias is applied across terminals of the CES, electrons may be injected into a metal-insulator-metal (MIM) diode over the potential barrier of the MIM device. When sufficient electrons have been injected and sufficient potential is applied across terminals to place the CES element in a set state, an increase in electrons may screen electrons and remove a localization of electrons, which may collapse the band-splitting potential forming a metal.

Current in a CES element may be controlled by an externally applied "compliance" condition determined based, at least in part, on the external current limited during a write operation to place the CES element in a conductive state. This externally applied compliance current may also set a condition of a current density for a subsequent reset operation to place the CES in an insulative state.

As shown in the particular implementation of FIG. 1, a current density $J_{comp}$ applied during a write operation at point 116 to place the CES element in a conductive state may determine a compliance condition for placing the CES element in an insulative state in a subsequent write operation. For example, the CES element may be subsequently placed in an insulative state by application of a current density $J_{reset} \geq J_{comp}$ at a voltage $V_{reset}$ at point 108, where $J_{comp}$ is externally applied.

The compliance condition therefore, may set a number of electrons in a CES element which are to be "captured" by holes for the Mott transition. In other words, a current applied in a write operation to place a CES element in a conductive memory state may determine a number of holes to be injected to the CES element for subsequently transitioning the CES element to an insulative memory state.

As pointed out above, a reset condition may occur in response to a Mott transition at point 108. As pointed out above, such a Mott transition may occur at condition in a CES element in which a concentration of electrons n equals a concentration of electron holes p.

A current or current density in a region 104 of the plot shown in FIG. 1 may exist in response to injection of holes from a voltage signal applied across terminals of a CES element. Here, injection of holes may meet a Mott transition criterion for the conductive state to insulative state transition at current IMI as a critical voltage VMI is applied across terminals of CES element.

A "read window" 102 for detecting a memory state of a CES element in a read operation may be set out as a difference between a portion 106 of the plot of FIG. 1 while the CES element is in an insulative state (i.e. a high impedance state), and a portion 104 of the plot of FIG. 1 while the CES element is in a conductive state (i.e. in a low impedance state) at a read voltage $V_{read}$.

Similarly, a "write window" 110 for placing a CES element in an insulative or conductive memory state in a write operation may be set out as a difference between $V_{reset}$ (at $J_{reset}$) and $V_{set}$ (at $J_{set}$). Establishing $|V_{set}|>|V_{reset}|$ enables a switch between conductive and insulative states. $V_{reset}$ may be approximately at a band splitting potential arising from correlation and $V_{set}$ may be approximately twice the band splitting potential. In particular implementations, a size of write window 110 may be determined, at least in part, by materials and doping of the CES element. The transition from high resistance (or high capacitance) to low resistance (or low capacitance) can be represented by a singular impedance of the device. Portion 112 of the plot of FIG. 1 shows the current consumption as a CES element undergoes a transition from a low impedance state to a high impedance state, while portion 114 of the plot shows the current consumption as a CES element undergoes a transition from a high impedance state to a low impedance state.

Figure 2A:
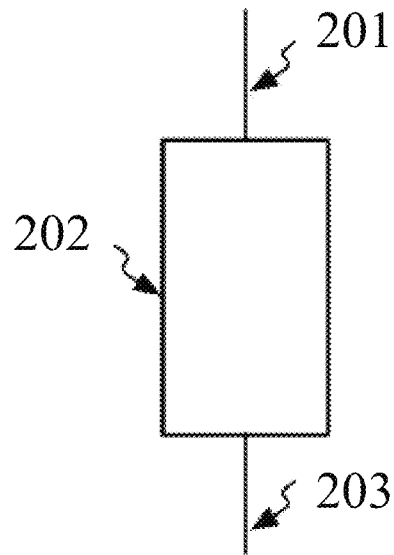
FIG. 2A is block diagram of an example embodiment of a correlated electron switch (CES) element comprising a correlated electron material.

FIG. 2A is block diagram of an example embodiment of a correlated electron switch (CES) element 200 comprising a correlated electron material (CEM) 202. The correlated electron material 202 may be sandwiched between conductive terminals, such as conductive terminals 201 and 203. In an embodiment, a CES device, such as CES device 200, may comprise a variable impeder device. As utilized herein, the terms "correlated electron switch" and "variable impeder" may be interchangeable. At least in part through application of a critical voltage and a critical current between the terminals, such as between conductive terminals 201 and 203, the CEM, such as material 202, may transition between the aforementioned conductive/lower impedance state and insulative/higher impedance state. As mentioned earlier, CEM, such as material 202, in a variable impeder device, such as CES device 200, may transition between a first impedance state and a second impedance state due to a quantum mechanical transition of the correlated electron switch material because of an applied critical voltage and an applied critical current, as described in more detail below. Also, as mentioned above, a variable impeder device, such as variable impeder device 200, may exhibit properties of both variable resistance and variable capacitance.

In a particular embodiment, a variable impeder device, such as CES device 200, may comprise a CEM that may transition between or among a plurality of detectable impedance states based, at least in part, on a transition of at least a majority portion of the CEM between an insulative/higher impedance state and a conductive/lower impedance state due to a quantum mechanical transition of the correlated electron switch material. For example, in an embodiment, a CES device may comprise a bulk switch, in that substantially all of a CEM of a CES device may switch from an insulative/ higher impedance state to a conductive/lower impedance state or from a conductive/lower impedance state to an insulative/higher impedance state responsive to a Mott-transition. In this context, an "impedance state" means a detectable state of a variable impeder device that is indicative of a value, symbol, parameter and/or condition, just to provide a few examples. In one particular embodiment, as described below, an impedance state of a CES device may be detected based, at least in part, on a signal detected on terminals of the CES device in a read and/or sense operation. In another particular embodiment, as described below, a CES device may be placed in a particular impedance state to represent or store a particular value, symbol, and/or parameter, and/or to achieve a particular capacitance value for the CES device by application of one or more signals across terminals of the CES device in a "write" and/or "program" operation, for example. Of course, claimed subject matter is not limited in scope to the particular example embodiments described herein.

Figure 2B:
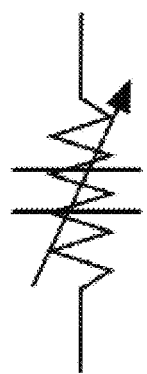
FIG. 2B is an example circuit symbol for a CES element.

FIG. 2B depicts an example symbol 210 that may be utilized, for example, in electrical circuit schematic diagrams to notate a CES/variable impeder device. Example symbol 210 is meant to remind the viewer of the variable resistance and variable capacitance properties of a CES/variable impeder device, such as CES device 200. Example symbol 210 is not meant to represent an actual circuit diagram, but is merely meant as an electrical circuit diagram symbol. Of course, claimed subject matter is not limited in scope in these respects.

Figure 3:
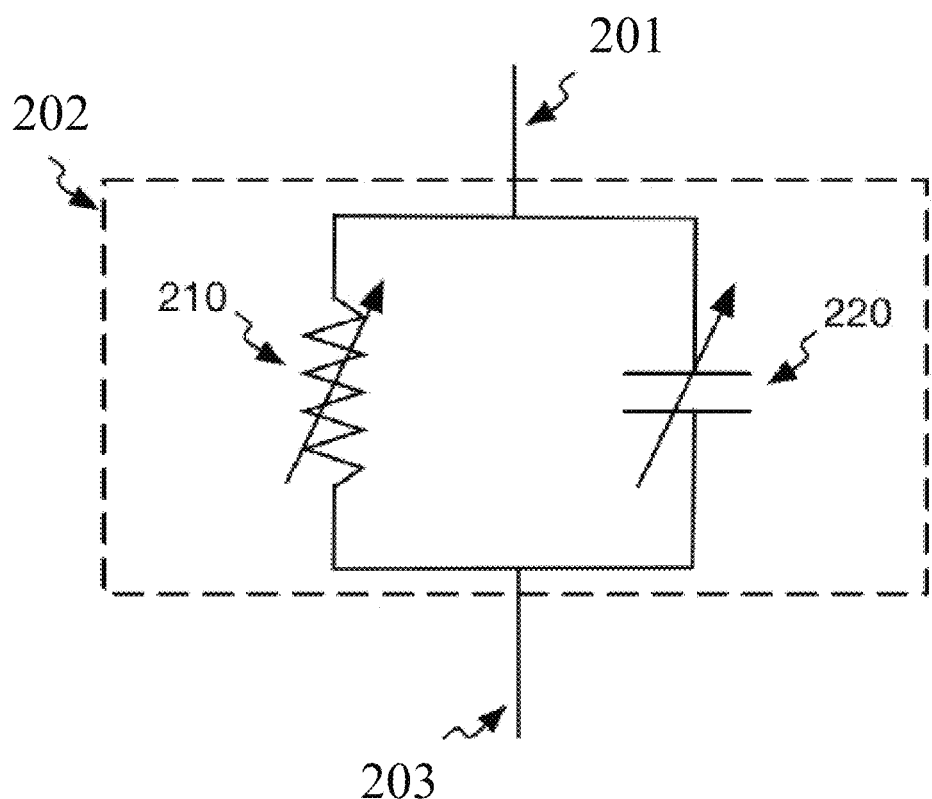
FIG. 3 is an example equivalent circuit for a CES element.

FIG. 3 depicts a schematic diagram of an equivalent circuit 300 of an example variable impeder device (such as a CES device), such as variable impeder device 202. As mentioned, variable impeder device 202 may comprise characteristics of both variable resistance and variable capacitance. For example, an equivalent circuit for a variable impeder device may, in an embodiment, comprise a variable resistor, such as variable resistor 210 in parallel with a variable capacitor, such as variable capacitor 220. Although the variable resistor 210 and variable capacitor 220 are depicted in FIG. 3 as discrete components, variable impeder device 202 may equally comprise a substantially homogenous CES element, wherein the CES element comprises characteristics of variable capacitance and variable resistance. Table 1 below depicts an example truth table for an example variable impedance device, such as variable impeder device 202.

TABLE 1

Correlated Electron Switch Truth Table

| Resistance | Capacitance | Impedance |
|---|---|---|
| $R_{high}(V_{applied})$ | $C_{high}(V_{applied})$ | $Z_{high}(V_{applied})$ |
| $R_{low}(V_{applied})$ | $C_{low}(V_{applied})$~0 | $Z_{low}(V_{applied})$ |

In an embodiment, the example truth table shown in Table 1 shows that a resistance of a variable impeder device, such as CES device 202, may transition between a lower resistance state and a higher resistance state that is a function, at least in part, of a voltage applied across the CEM. In an embodiment, a resistance of a lower resistance state may be 10 to 100,000 times lower than a resistance of a higher resistance state, although claimed subject matter is not limited in scope in this respect. Similarly, Table 1 shows that a capacitance of a variable impeder device, such as CES device 202, may transition between a lower capacitance state, which for an example embodiment may comprise approximately zero, or very little, capacitance, and a higher capacitance state that is a function, at least in part, of a voltage applied across the CEM. Also, as shown in Table 1, a variable impeder device's transition from a higher resistance/higher capacitance state to a lower resistance/lower capacitance state may be represented as a transition from a higher impedance state to a lower impedance state. Similarly, a transition from a lower resistance/lower capacitance state to a higher resistance/higher capacitance state may be represented as a transition from a lower impedance state to a higher impedance state.

It should be noted that a variable impeder, such as CES 202, is not a resistor, but rather comprises a device having properties of both variable capacitance and variable resistance. In an embodiment, resistance and/or capacitance values, and therefore impedance values, depend, at least in part, on an applied voltage.

As used herein, the terms "conductive state", "lower impedance state", and/or "metal state" may be interchangeable, and/or may at times be referred to as a "conductive/lower impedance state". Similarly, the terms "insulative state" and "higher impedance state" may be used interchangeably herein, and/or may at times be referred to as an "insulative/higher impedance state". The term "impedance state" is used interchangeably herein with the terms "resistance state" and "capacitance state".

In this context, it should be understood that the term "low impedance state" (also referred to herein as "LIS", and used to mean a low impedance and low capacitance), and the term "high impedance state" (also referred to herein as "HIS", and used to mean a high impedance and high capacitance) are relative terms and not specific to any particular quantity or value for conductance, impedance, or capacitance. For example, whilst in a first memory state the CES element may be more conductive (or less insulative), than while the CES element is in a second memory state.

Figure 4:
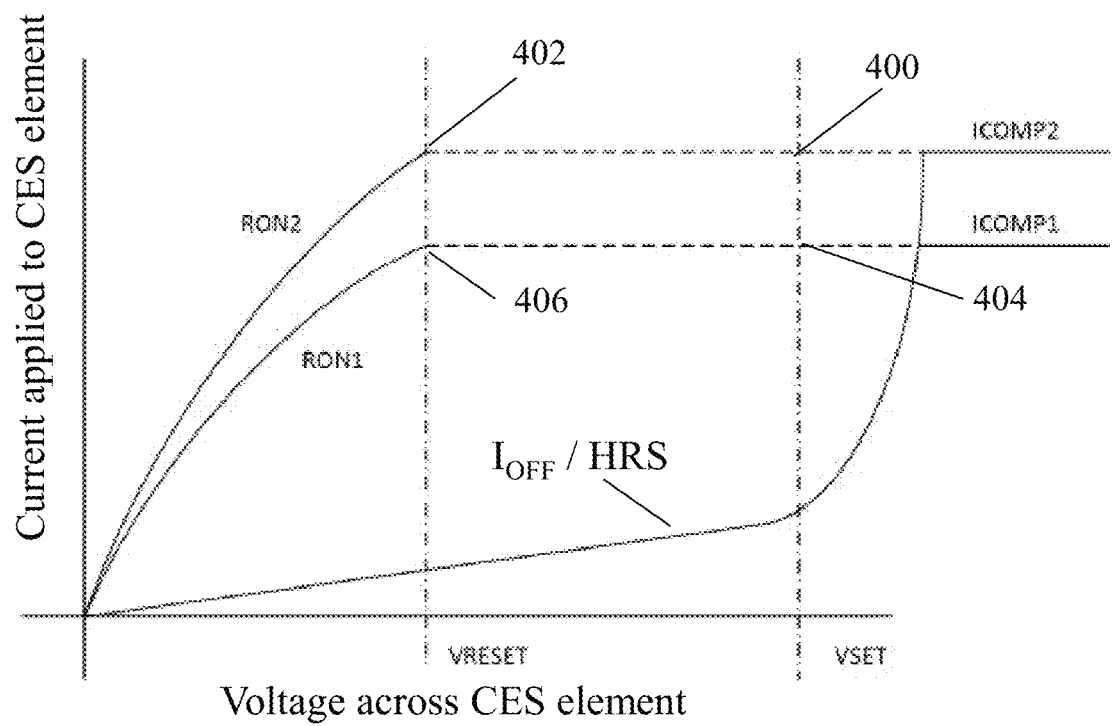
FIG. 4 is a schematic diagram of using compliance current to adjust a low resistance value of a correlated electron device.

FIG. 4 is a schematic diagram showing how compliance current may be used to adjust a low impedance value of a CES element. (As mentioned above, 'impedance' may correspond to resistance, capacitance or a combination of resistance and capacitance of the CES element). Transitioning a CES element from a conductive/lower impedance state to an insulative/higher impedance state (i.e. a reset condition) or from an insulative/higher impedance state to a conductive/lower impedance state (i.e. a set condition) may require a current to flow through the CES element which is sufficient to cause a Mott or Mott-like transition to occur in the correlated electron material (CEM) of the CES element at a specific voltage. As shown in FIG. 1, to achieve a reset condition to cause a transition from a conductive/lower impedance state to an insulative/higher impedance state, a voltage $V_{reset}$ may be applied across a CES element, and a current density $J_{reset}$ may be achieved in the CES element. Both the voltage and current conditions need to be met, in an embodiment, before a reset condition can be achieved resulting in a transition from a conductive/lower impedance state to an insulative/higher impedance state. Similarly, as also shown in FIG. 1, to achieve a set condition to cause a transition from an insulative/higher impedance state to a conductive/lower impedance state, a voltage $V_{set}$ may be applied across a CES element, and a current density $J_{set}$ may be achieved in the CES element.

Turning back to FIG. 4, application of different compliance currents to a CES element may enable the low impedance state of the CES element to be adjusted. For example, by increasing a voltage V across the CES element from $V_{reset}$ up to $V_{set}$, and by applying a particular compliance current to the CES element, the set condition may be achieved such that the CES element transitions in a particular low impedance state. Varying the compliance current applied to the CES element may enable the CES element to be set into a particular low impedance state.

Current in a CES element may be controlled by an externally applied "compliance" condition determined, at least in part, on the external current limited during a write operation to achieve a set condition to place the CES device in a conductive/lower impedance state. This externally applied compliance current also sets the subsequent reset condition current density requirement. FIG. 4 shows the I-V characteristics of a CES element (which comprises a correlated electron material, CEM). The CES element has a high impedance state (or high resistance state, HRS/$I_{OFF}$), and one or more low impedance states ($I_{ON}$). The CES element transitions from $I_{ON}$ to $I_{OFF}$ when the voltage applied across the CES element reaches $V_{RESET}$. The state of the CES element may be set to a low impedance state once the voltage across the CES element reaches $V_{SET}$. The CES element may be set to multiple low impedance states (or ION values), depending on the compliance current applied to the CES element. In FIG. 4, two different compliance currents are shown ($I_{COMP1}$ and $I_{COMP2}$) which result in $I_{ON1}$ (at point 406) and $I_{ON2}$ (at point 402), and associated resistances of $R_{ON1}$ and $R_{ON2}$.

As shown in the particular implementation of FIG. 4, a current density $I_{COMP2}$ applied during a write operation at point 400 to place the CES element in a conductive/lower impedance state may provide a current Ion at point 402 given by:

$$Ion = Icomp2 \cdot C(\exp(V)) \cdot \sqrt{V} \qquad \text{(Equation 1)}$$

It will be understood that a low impedance state can be modified by setting the compliance current, because the current $I_{on}$ in the low impedance state varies inversely with the compliance current. Therefore, a current density $I_{COMP1}$ at point 404 may provide an $I_{on}$ value at 406 which is lower than that provided by $I_{COMP2}$ at point 400. In the present techniques, this property of correlated electron materials is exploited to enable CES elements (which comprise CEMs) to be used to (a) store accumulated states (i.e. store the summed inputs into a neuron) and/or (b) store a threshold value (for a neuron) and/or (c) store analogue or digital synaptic weights (for a synapse). Thus, CES elements may be used to perform the summing function of a neuron, the outputting/firing function of a neuron, and/or a weighting function of a synapse.

A compliance current, such as an externally applied compliance current, therefore may set a number of electrons in a CEM of a CES element which are to be "captured" by holes for the Mott transition. In other words, a current applied during a write operation to place a CES element in a conductive/lower impedance state may determine a number of holes to be injected to the CEM of the CES element for subsequently transitioning the CES element to an insulative/higher impedance state.

Thus, the above-described properties of a CES element (comprising a CEM) indicate that a CES element may be usable to provide the functions of either, or both of, a neuron and a synapse. Specifically, a synapse may need to have one or more of the following properties:

A large high impedance state—this is provided by a CES element because the CES impedance/resistance is very large when the CES element is in an 'off' state. The CES element effectively behaves as a pure insulator in this off state.

A large number of stable or reliable resistance states to enable the synapse to provide any synaptic weight—this is provided by a CES element because the CES element can be set into any one of a substantially unlimited number of impedance states by varying the compliance current applied to the CES element.

A large on/off impedance ratio to provide greater precision—this is provided by a CES element because the impedance of the CES element in a high impedance state may be at least 100 times greater than the impedance of the CES element in a low impedance state.

The ability to store synaptic weights—this is provided by a CES element because it is non-volatile.

Similarly, a neuron may need to have one or more of the following properties:

Sharp set (or reset) conditions so that the neuron is able to transition quickly from accumulating/summing inputs to producing an output when a threshold condition (e.g. a specific voltage or current value) is met, and is able to transition quickly from producing an output to resetting so that accumulation of inputs can begin again—this is provided by a CES element because it exhibits exceptionally fast transitions during both the setting and resetting processes, which typically occur on the femtosecond scale.

The ability to store accumulated values/accumulated states—this is provided by a CES element because multiple input currents may be combined and stored in the CES element, effectively as a new compliance current ($I_{COMP}$).

The ability to change state when certain conditions are met, i.e. to fire/produce an output when a threshold condition is met—this is provided by a CES element because the CES element resets when a threshold current or voltage is reached.

Thus, the present techniques provide an apparatus for an artificial neural network, the apparatus comprising a synapse provided by at least one correlated electron switch (CES) element, wherein the synapse is capable of: storing synaptic weights; operating in a high impedance state; and operating in one of a plurality of low impedance states.

The present techniques also provide an apparatus for an artificial neural network, the apparatus comprising a neuron provided by at least one correlated electron switch (CES) element, wherein the neuron is capable of: a fast transition into a high impedance state when a reset condition occurs; a fast transition into one of a plurality of low impedance states when a set condition occurs; accumulating currents input into the neuron as an accumulated current and outputting a signal when the accumulated current equals or exceeds a threshold current; and accumulating voltages input into the apparatus as an accumulated voltage and outputting a signal when the accumulated voltage equals or exceeds a threshold voltage. For current accumulation, the current may accumulate within the at least one CES element, and for voltage accumulation, the voltage may accumulate across the at least one CES element or across the apparatus/neuron. In either case, when the voltage or current threshold is reached, the neuron will fire, i.e. transmit information or a signal.

The present techniques also provide an apparatus for an artificial neural network, the apparatus capable of functioning as a synapse or as a neuron, and comprising at least one correlated electron switch (CES) element capable of: storing synaptic weights; operating in a high impedance state; operating in one of a plurality of low impedance states; a fast transition into a high impedance state when a reset condition occurs; a fast transition into one of a plurality of low impedance states when a set condition occurs; accumulating currents input into the apparatus as an accumulated current and outputting a signal when the accumulated current equals or exceeds a threshold current; and accumulating voltages input into the apparatus as an accumulated voltage and outputting a signal when the accumulated voltage equals or exceeds a threshold voltage. That is, the apparatus may be able to configure the at least one CES element to either function as a synapse or a neuron, and may be able to switch between the two as required.

In embodiments, an impedance value of the high impedance state of the or each CES element of the synapse (or the apparatus which is configurable to function as a synapse) may be at least 100 times larger than an impedance value of each of the plurality of low impedance states.

The synapse (or the at least one CES element of the apparatus which is configurable to function as a synapse) may be programmable into one of the plurality of low impedance states depending on a compliance current applied to the at least one CES element.

The apparatus may be in a low power consumption state when the synapse (or the at least one CES element) is operating in a high impedance state.

In embodiments, the reset condition which causes the fast transition into a high impedance state may comprise applying a reset voltage across the at least one CES element and having a reset current density in the at least one CES element.

In embodiments, the set condition which causes the fast transition into a low impedance state may comprise applying a set voltage across the at least one CES element and having a set current density in the at least one CES element.

In embodiments, the fast transition into a high impedance state and the fast transition into one of a plurality of low impedance states may take place very quickly. For example, the transitions may take place during a transition timescale of less than a millisecond, less than a microsecond, less than a nanosecond, less than a picosecond or less than a femtosecond.

Figure 5A:
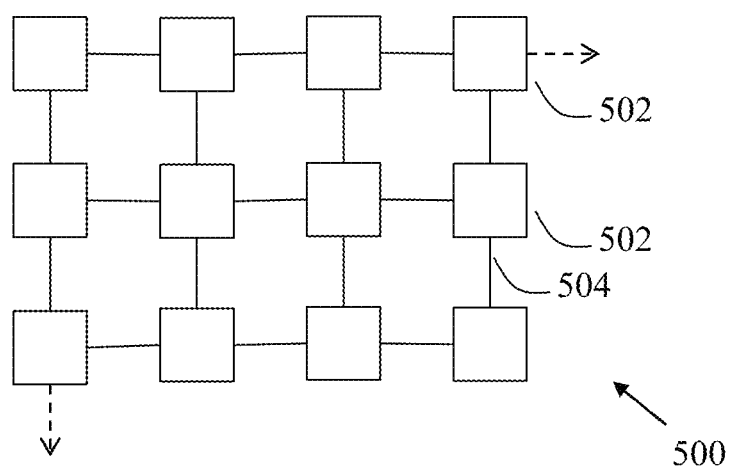
FIG. 5A is a plan view of a schematic of a 2D array comprising a plurality of apparatuses, where each apparatus is configurable as a synapse or a neuron.

FIG. 5A is a plan view of a portion of a 2D array 500 comprising a plurality of apparatuses 502, where each apparatus 502 may be configurable as a synapse or a neuron. In embodiments, the array 500 may be formed of apparatuses 502 which are all configured to function as neurons, all configured to function as synapses, or a combination thereof. The array structure shown here is merely exemplary. The plurality of apparatuses 502 may be arranged in an array, in a linear structure, in a tree (branching) structure, or in any other configuration.

In embodiments, each apparatus 502 in array 500 may be configured to function as a neuron. Each apparatus 502 comprises at least one CES element which is configurable to provide neuron functionality/properties, as described above. Each neuron 502 in array 500 may be programmed to have the same or different threshold values (i.e. a threshold voltage, a threshold current, a threshold charge, etc.), but each neuron may have the same type of threshold value (i.e. current, voltage, charge) for ease of construction and implementation. A neuron 502 may be coupled to another neuron via a synapse 504, which enables signals to be transmitted between neurons. In embodiments, the synapse 504 may be a wire or other conductive channel or conductive means to enable electrical signals (e.g. voltage or current spikes) that are outputted by one neuron to be received by another neuron. The synapse 504 may enable a synaptic current to flow between the neurons 502, where the synaptic current may be based on the output of a neuron. In embodiments, the synapse 504 may comprise or implement weights or weighting functions, such that the output voltage/current of one neuron is weighted by the synapse 504 before it is transmitted as an input to another neuron. Each synapse 504 may therefore comprise a CES element which is configurable to provide synapse functionality/properties, as described above. Each synapse 504 may store the same or a different weight. Each CES element of each synapse 504 may be separately programmed to store a particular weight, by applying a particular compliance current to the CES element to program the CES element into a corresponding impedance state.

In embodiments, array 500 may be used to form a synapse and each apparatus 502 may be configured to store synaptic weights for the synapse. Each apparatus 502 therefore comprises at least one CES element. The synapse 500 may provide a conductance matrix, i.e. a means to weight input signals and provide a weighted output. The array 500 may be a crosspoint array. The crosspoint array may be used to sum the dot-product computation of weights and input signals to output a signal (e.g. a synaptic current) as an input into a neuron. The array 500 may be an array of 'n' rows and 'm' columns (where n and m may be different or equal integer values), and an apparatus 502 (that comprises at least one CES element) may be provided at each intersection of a row and column. Each CES element may be programmed into a particular impedance state in order to implement the weights of the array 500. The CES elements may be used to implement binary weights, such that they are either in a high impedance state (0) or a low impedance state (1), or to implement analogue weights, such that they are either in a high impedance state or one of a plurality of low impedance states. The size of synapse 510 may be dynamically configurable by, for example, coupling apparatuses 502 into or out of the array 500.

Thus, the above-described properties of a CES element (comprising a CEM) demonstrate that an array of apparatuses comprising one or more CES elements may be formed to provide a neural network or a synapse.

The present techniques therefore provide for the use of an apparatus of the types described herein as a synapse and/or as a neuron in an artificial neural network.

The present techniques provide a crosspoint array for an artificial neural network, the crosspoint array comprising at least one of the apparatuses described herein.

The present techniques provide a multi-layer crosspoint array for an artificial neural network, the crosspoint array comprising at least one of the apparatuses described herein.

Figure 5B:
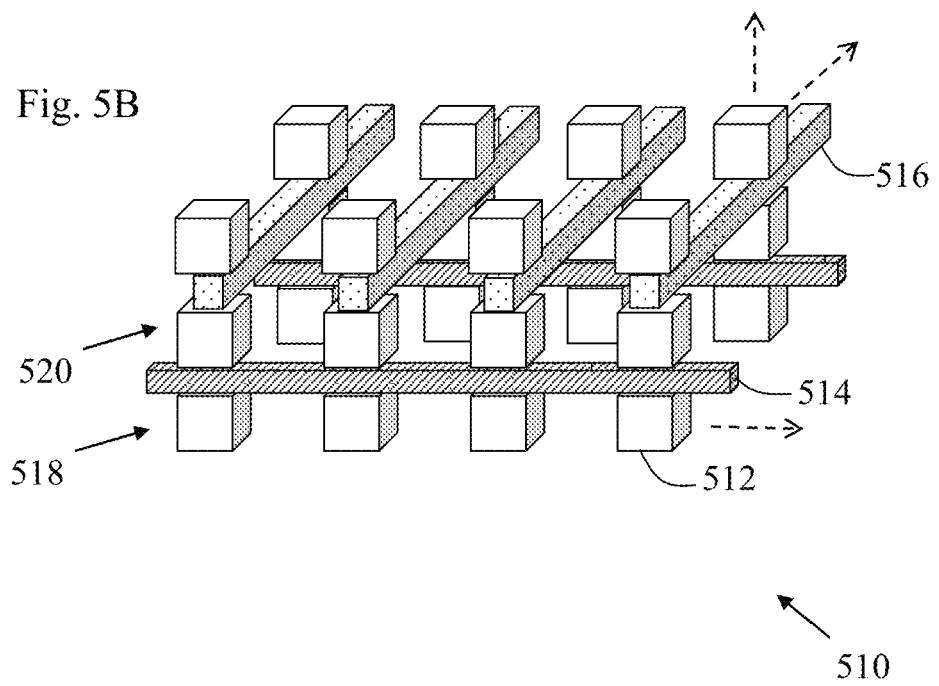
FIG. 5B is a side view of a schematic of a 3D array comprising a plurality of apparatuses, where each apparatus is configurable as a synapse or a neuron.

FIG. 5B is a side view of a portion of a 3D array 510 comprising a plurality of apparatuses 512, where each apparatus 512 comprises at least one CES element that is configurable as a synapse or a neuron. In embodiments, each CES element of each apparatus 512 may be configured as a neuron, such that the 3D array 510 forms a 3D neural network. The array 510 comprises multiple layers of neurons 512, e.g. layer 518 and layer 520, which are stacked to provide a three-dimensional structure. Each layer may be coupled to the layer above in the stack by word lines 514 or bit lines 516, for example.

In embodiments, the array 510 may be used to form a synapse of a configurable size. Each apparatus 512 within array 510 may be configured to store synaptic weights for the synapse. Each apparatus 502 therefore comprises at least one CES element. The synapse 510 may provide a conductance matrix, as explained above. The array 510 may be used to sum the dot-product computation of weights and input signals to output a signal (e.g. a synaptic current) as an input into a neuron. The array 510 may comprise multiple layers that comprise apparatuses 512 that can each store a synaptic weight, e.g. layer 518 and layer 520. The layers 518, 520 are stacked to provide a three-dimensional structure. Each layer 518, 520 of the 3D array 510 may comprise an array (e.g. a 2D array of the type shown in FIG. 5A) of apparatuses 512 that each store a synaptic weight. Each layer may be coupled to the layer above in the stack by word lines 514 or bit lines 516, for example. Each CES element of each apparatus 512 may be programmed into a particular impedance state in order to implement the weights of the synapse 510. The CES elements may be used to implement binary weights, such that they are either in a high impedance state (0) or a low impedance state (1), or to implement analogue weights, such that they are either in a high impedance state or one of a plurality of low impedance states. The size of synapse 510 may be dynamically configurable by either coupling apparatuses 512 into or out of a particular layer (e.g. layer 518, 520), or by coupling or decoupling layers into the synapse 510. Thus, a flexible, 3D stacking synapse may be provided.

Thus, the present techniques provide a configurable array for an artificial neural network, where the configurable array may comprise: a plurality of apparatuses, each apparatus comprising at least one correlated electron switch (CES) element capable of functioning as a synapse or as a neuron; and a switching mechanism to switch the function of the at least one CES element in each of the plurality of apparatuses.

In the configurable array, when a CES element in one of the plurality of apparatuses is switched to function as a synapse, the CES element may be capable of: storing synaptic weights; operating in a high impedance state; and operating in one of a plurality of low impedance states.

In the configurable array, when a CES element in one of the plurality of apparatuses is switched to function as a neuron, the CES element may be capable of: a fast transition into a high impedance state when a reset condition occurs; a fast transition into one of a plurality of low impedance states when a set condition occurs; and accumulating currents input into the apparatus as an accumulated current.

In embodiments of the configurable array, each apparatus of the plurality of apparatuses may be selectable, and a size of the array may be adjustable by: selecting each of the plurality of apparatuses; and coupling the selected apparatus into the array or decoupling the selected apparatus from the array.

The present techniques also provide a three-dimensional (3D) configurable array which may comprise: at least two layers, each layer comprising an array of apparatuses of the types described herein, wherein the layers are arranged in a stack; and electrical coupling between adjacent layers of the in the stack; wherein a size of the 3D array is adjustable by disconnecting or connecting layers of the stack. The 3D configurable array may provide a synapse where the size of the synapse may be adjustable.

Figure 6:
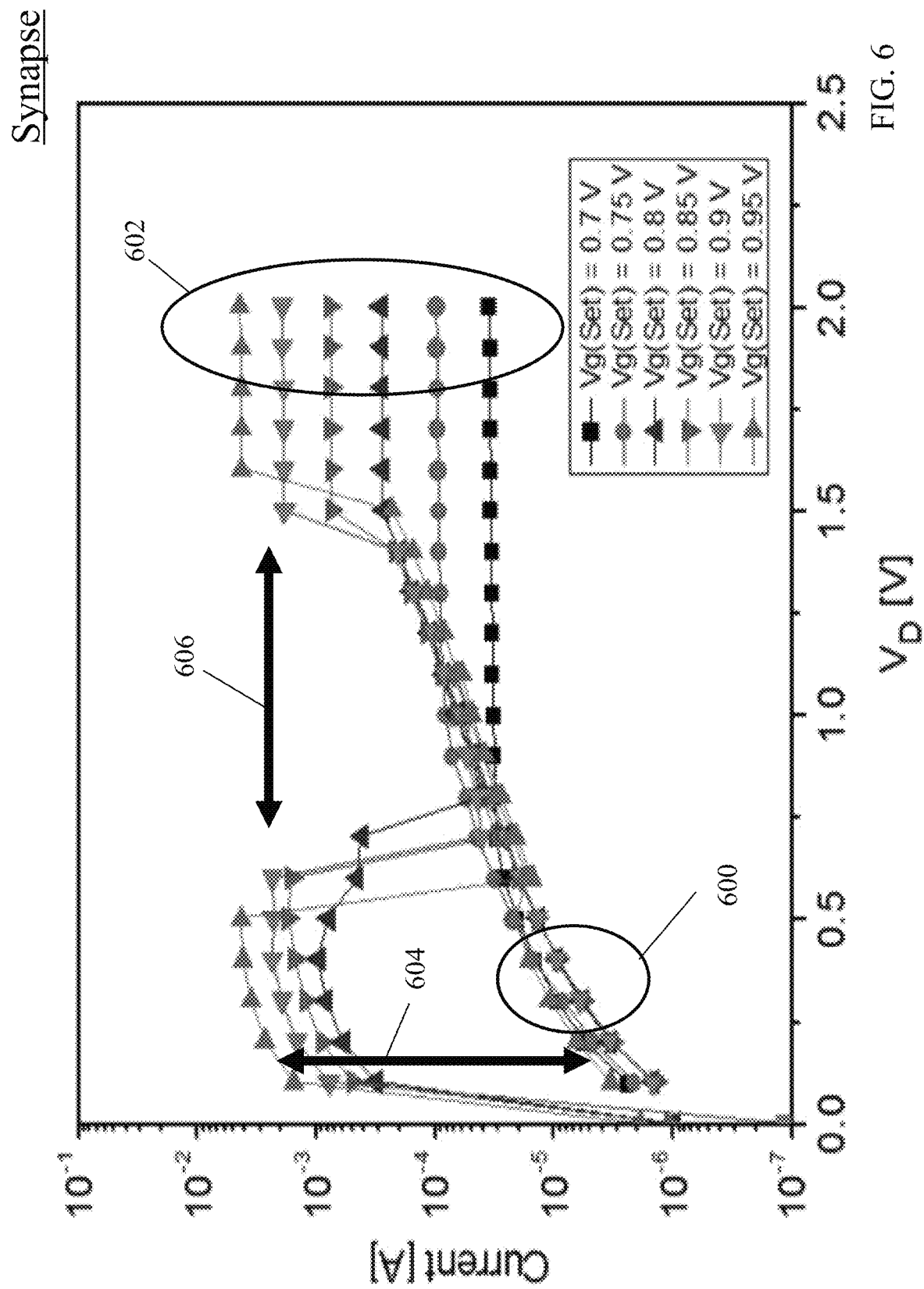
FIG. 6 is a graph showing how a CES element may be configured to provide a synapse for an artificial neural network.

FIG. 6 is a graph showing the I-V (current-voltage) characteristics of a CES element obtained via experimentation. The graph shows how the I-V characteristics enable a CES element to be configured to provide synapse functionality for an artificial neural network. The application of different compliance currents to the CES element may enable the low impedance state of the CEs element to be adjusted. For example, by adjusting the voltage $V_{set}$ across the CES element between 0.7V to 0.95V, and by applying a different compliance current to the CES element, it was possible to transition the CES element into different, distinct low impedance states, as shown at 602 in FIG. 6. (In the experiments, the compliance current applied to the CES element was controlled by a MOSFET coupled to the CES element). Thus, the CES element may be set into any one of a substantially unlimited number of impedance states by varying the compliance current and voltage applied to the CES element. Accordingly, the CES element may be programmed into a large number of stable or reliable resistance states to enable the synapse to provide any synaptic weight.

As shown at 600 in FIG. 6, the CES element exhibits a large high impedance state when the CES element is in an 'off' state. The CES element effectively behaves as a pure insulator in this off state.

As shown by arrow 604, the difference between the 'on' state (low) impedance and the 'off' state (high) impedance of the CES element is large—the impedance of the CES element in a high impedance state may be at least 100 times greater than the impedance of the CES element in a low impedance state. This provides greater precision or accuracy to a CES-based synapse.

Arrow 604 also shows a read window for reading a CES element—this window is non-volatile and means that a CES element is suitable for storing synaptic weights. In comparison, arrow 606 shows a write window for writing to a CES element, i.e. when the state of the CES element may be changed.

Figure 7:
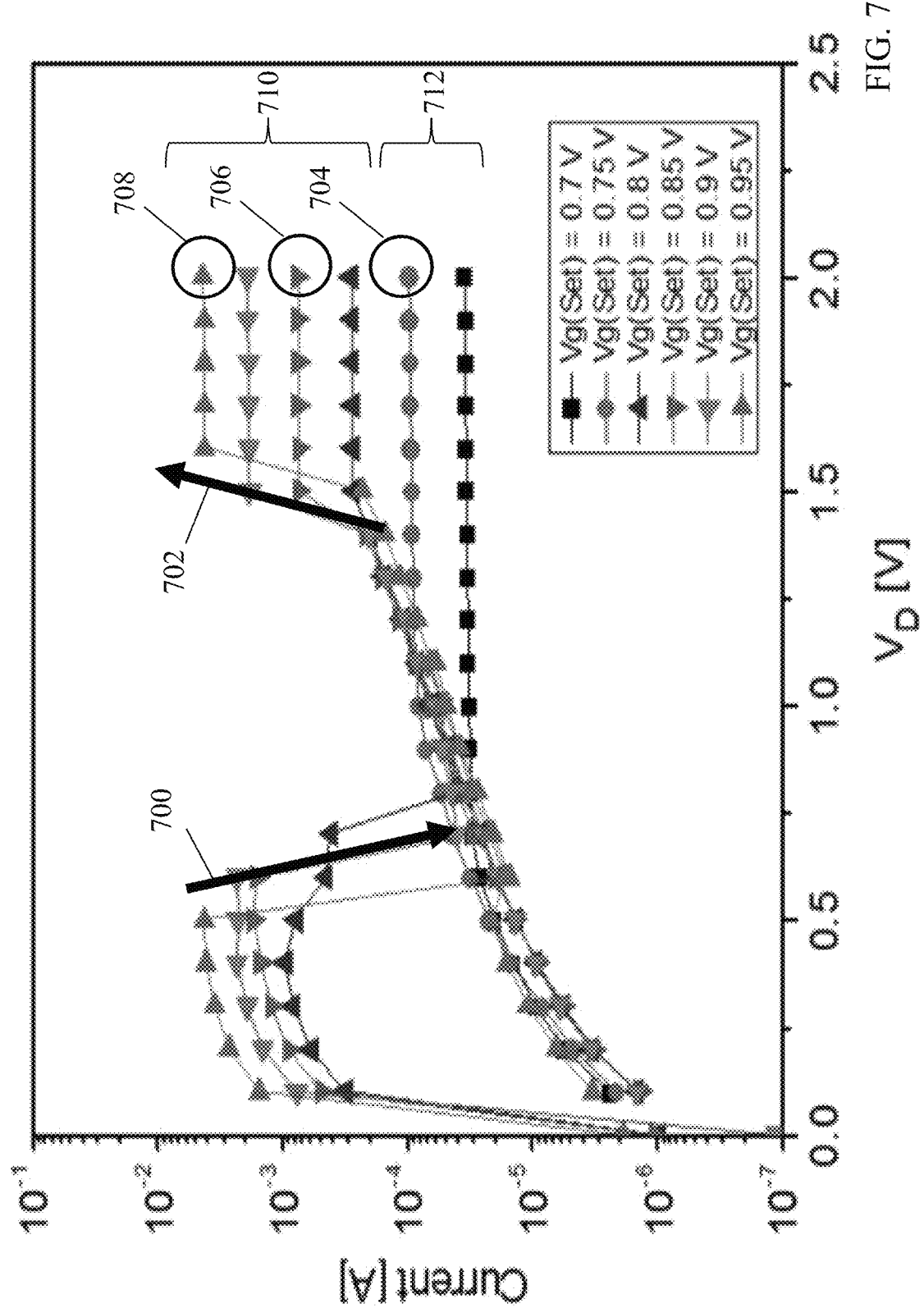
FIG. 7 is a graph showing how a CES element may be configured to provide a neuron for an artificial neural network.

FIG. 7 is a graph showing the I-V (current-voltage) characteristics of a CES element obtained via experimentation. The graph shows how the I-V characteristics enable a CES element to be configured to provide neuron functionality for an artificial neural network.

As shown by arrows 700 and 702, the CES element exhibits sharp sets and resets, such that a CES-element based neuron is able to transition quickly from accumulating/summing inputs to producing an output when a threshold condition is met (as shown by arrow 700), and is able to transition quickly from producing an output to resetting to a threshold value (as shown by arrow 702) so that accumulation of inputs can begin again. The transitions were experimentally observed to occur on the femtosecond scale. This allows for a fast CES-based neuron, which improves the speed and efficiency of a CES-based neural network. For a fast CES-based neuron, the transitions occur in a period of less than a millisecond, preferably less than a femtosecond.

The CES element is able to store the sum of inputs into the CES element, as per a neuron. For example, currents input into the CES element were observed to be combined and stored in the CES element as a new impedance state. For example, current 704 and current 706 input into the CES element were summed and stored as compliance current 708. That is, multiple input currents may be combined and stored in the CES element, effectively as a new compliance current ($I_{COMP}$).

Experiments showed that the CES element was able to change (impedance) state when certain conditions were satisfied. For example, if a CES element is programmed to have/set to have a particular compliance current value (which provides the threshold condition of the CES-element based neuron), it was observed that a transition between states only occurred when the compliance current value was reached or exceeded. Currents 712, for example, were below the threshold value/compliance current of the CES element, and therefore do not cause the CES element to transition from a high impedance state to a low impedance state. Currents 710 however, were each above the threshold value/compliance current of the CES element and therefore, cause the CES element to transition from a high impedance state to a particular low impedance state. It will be understood that a CES element may also be programmed to have a threshold voltage, such that when the accumulated voltage across a CES element reaches or exceeds the threshold voltage, the CES element undergoes a state transition and fires. Accordingly, the CES element is able to fire/produce an output when a threshold condition (e.g. voltage or current threshold) is met, as per a neuron.

Accordingly, some features of the disclosed embodiments are set out in the following numbered items:

1. An apparatus for an artificial neural network, the apparatus capable of functioning as a synapse or as a neuron, and comprising at least one correlated electron switch (CES) element capable of: storing synaptic weights; operating in a high impedance state; operating in one of a plurality of low impedance states; a fast transition into a high impedance state when a reset condition occurs; a fast transition into one of a plurality of low impedance states when a set condition occurs; accumulating currents input into the apparatus as an accumulated current and outputting a signal when the accumulated current equals or exceeds a threshold current; and accumulating voltages input into the apparatus as an accumulated voltage and outputting a signal when the accumulated voltage equals or exceeds a threshold voltage.

2. The apparatus in item 1 wherein an impedance value of the high impedance state is at least 100 times larger than an impedance value of each of the plurality of low impedance states.

3. The apparatus in item 1 wherein, when the apparatus functions as a synapse, the at least one CES element is programmable into one of the plurality of low impedance states depending on a compliance current applied to the at least one CES element.

4. The apparatus in item 1 wherein, when the apparatus functions as a synapse, the apparatus is in a low power consumption state when the at least one CES element is operating in a high impedance state.

5. The apparatus in item 1 wherein, when the apparatus functions as a neuron, the reset condition which causes the fast transition into a high impedance state comprises a reset voltage applied across the at least one CES element and a reset current density in the at least one CES element.

6. The apparatus in item 1 wherein, when the apparatus functions as a neuron, the set condition which causes the fast transition into a low impedance state comprises a set voltage applied across the at least one CES element and a set current density in the at least one CES element.

7. The apparatus in item 1 wherein, when the apparatus functions as a neuron, the fast transition into a high impedance state and the fast transition into one of a plurality of low impedance states takes place during a transition timescale of less than a millisecond, preferably less than a femtosecond.

8. Use of an apparatus as recited in item 1 as a synapse in an artificial neural network.

9. Use of an apparatus as recited in item 1 as a neuron in an artificial neural network.

10. A crosspoint array for an artificial neural network, the crosspoint array comprising at least one apparatus as recited in item 1.

11. A multi-layer crosspoint array for an artificial neural network, the crosspoint array comprising at least one apparatus as recited in item 1.

12. A configurable array for an artificial neural network, the configurable array comprising: a plurality of apparatuses, each apparatus comprising at least one correlated electron switch (CES) element capable of functioning as a synapse or as a neuron; and a switching mechanism to switch the function of the at least one CES element in each of the plurality of apparatuses.

13. The configurable array in item 12 wherein when a CES element in one of the plurality of apparatuses is switched to function as a synapse, the CES element is capable of: storing synaptic weights; operating in a high impedance state; and operating in one of a plurality of low impedance states.

14. The configurable array in item 12 wherein when a CES element in one of the plurality of apparatuses is switched to function as a neuron, the CES element is capable of: a fast transition into a high impedance state when a reset condition occurs; a fast transition into one of a plurality of low impedance states when a set condition occurs; and accumulating currents input into the apparatus as an accumulated current.

15. The configurable array in item 12 wherein each apparatus of the plurality of apparatuses is selectable, and wherein a size of the array is adjustable by: selecting each of the plurality of apparatuses; and coupling the selected apparatus into the array or decoupling the selected apparatus from the array.

16. A three-dimensional (3D) configurable array comprising: at least two layers, each layer comprising an array of apparatuses as recited in claim 1, wherein the layers are arranged in a stack; and electrical coupling between adjacent layers of the in the stack; wherein a size of the 3D array is adjustable by disconnecting or connecting layers of the stack.

17. The 3D configurable array in item 16 wherein the array provides a synapse and the size of the synapse is adjustable.

18. An apparatus for an artificial neural network, the apparatus comprising a synapse provided by at least one correlated electron switch (CES) element, wherein the synapse is capable of: storing synaptic weights; operating in a high impedance state; and operating in one of a plurality of low impedance states.

19. An apparatus for an artificial neural network, the apparatus comprising a neuron provided by at least one correlated electron switch (CES) element, wherein the neuron is capable of: a fast transition into a high impedance state when a reset condition occurs; a fast transition into one of a plurality of low impedance states when a set condition occurs; accumulating currents input into the neuron as an accumulated current and outputting a signal when the accumulated current equals or exceeds a threshold current; and accumulating voltages input into the apparatus as an accumulated voltage and outputting a signal when the accumulated voltage equals or exceeds a threshold voltage.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from the any inventive concept as defined in the appended claims.

The invention claimed is:

1. An apparatus for an artificial neural network, the apparatus comprising:
at least one correlated electron switch (CES) element to be configurable to:
store one or more synaptic weights;
operate in a high impedance state;
operate in one or more low impedance states;
establish a threshold current responsive to transition of the at least one CES element to one of the one or more low impedance states;
transition to the high impedance state responsive to a current in the at least one CES element meeting or exceeding the threshold current; and
accumulate currents inputted to the apparatus as an accumulated current and output a signal responsive to the accumulated current equaling or exceeding the established threshold current.

2. The apparatus as claimed in claim 1 wherein an impedance value of the high impedance state is at least 100 times larger than an impedance value of each of the one or more low impedance states.

3. The apparatus as claimed in claim 1 wherein, the at least one CES element is to be programmable to store a synaptic weight of the one or more synaptic weights as one of the one or more low impedance states depending on a compliance current applied to the at least one CES element.

4. The apparatus as claimed in claim 1 wherein, if configured as a synapse, the apparatus is adaptable to be in a low power consumption state responsive to placement of the at least one CES element in the high impedance state.

5. The apparatus as claimed in claim 1 wherein, if the at least one CES element is configured as a neuron, the at least one CES element is configured to transition to the high impedance state responsive to a reset voltage applied across the at least one CES element and a reset current density in the at least one CES element.

6. The apparatus as claimed in claim 1 wherein, if configured as a neuron, the at least one CES element configured to transition to a low impedance state of the one or more low impedance states responsive to a set voltage applied across the at least one CES element and a set current density in the at least one CES element.

7. The apparatus as claimed in claim 1 wherein the at least one CES element is capable of performing the transition to the high impedance state within 1.0 ms, and wherein the at least one CES element is capable of performing the transition to a low impedance state of the one or more low impedance states within 1.0 ms.

8. The apparatus as recited in claim 1, wherein the apparatus is adapted to form a crosspoint array.

9. The apparatus as recited in claim 1, wherein the apparatus is adapted to form a layered crosspoint array.

10. The apparatus of claim 1, wherein the artificial neural network comprises a three-dimensional (3D) configurable array comprising:
at least two layers, each layer comprising an array of neurons, wherein the layers are arranged in a stack; and
electrical coupling between adjacent layers of the stack;
wherein a size of the 3D configurable array is adjustable by disconnecting or connecting layers of the stack.

11. The apparatus of claim 10, wherein the 3D configurable array is to provide a synapse, and wherein a size of the synapse is adjustable.

12. The apparatus claimed in claim 1 wherein the outputted signal is to be a portion of a sum of a dot-product computation of synaptic weights and input signals received at the artificial neural network, the outputted signal is to provide an input signal to at least one second neuron of a plurality of neurons.

13. A configurable array for an artificial neural network, the configurable array comprising:
a plurality of apparatuses, each apparatus comprising one or more correlated electron switch (CES) elements, individual CES elements to be capable of functioning as either a synapse or as a neuron; and
a switching mechanism to selectively configure at least one of the one or more CES elements to function as the synapse or the neuron.

14. The configurable array as claimed in claim 13 wherein responsive to a CES element of one of the plurality of apparatuses being switched to function as a synapse, the CES element is capable of:
storing synaptic weights;
operating in a high impedance state; and
operating in one of a plurality of low impedance states.

15. The configurable array as claimed in claim 13, wherein responsive to a CES element of one of the plurality of apparatuses being switched to function as a neuron, the CES element is capable of:
a transition to a high impedance state responsive to occurrence of a reset condition;
a transition to one of a plurality of low impedance states responsive to occurrence of a set condition; and
accumulate currents input into an apparatus of the plurality of apparatuses as an accumulated current.

16. The configurable array as claimed in claim 13 wherein each apparatus of the plurality of apparatuses is selectable, and wherein a size of the configurable array is adjustable by:
a selection of each of the plurality of apparatuses; and
a coupling of the selected apparatus into the configurable array or a decoupling of the selected apparatus from the configurable array.

17. The configurable array of claim 13, wherein if at least a first one of the individual CES elements is configured as a synapse, the at least the first one of the individual CES elements configured to store a synaptic weight corresponding to a compliance current.

18. The configurable array of claim 17, wherein if at least a second of the individual CES elements is configured as a neuron, the at least the second of the individual CES elements is capable of conducting a corresponding compliance current.

19. An apparatus for an artificial neural network, the apparatus comprising one or more correlated electron switch (CES) elements, wherein
at least a first CES element is adapted to:
establish a threshold current responsive to the first CES element transitioning to low impedance state; and
provide an output signal responsive to a transition of the first CES element to a high impedance state, wherein:
the transition of the first CES element is to occur responsive to a current in the first CES element equaling or exceeding the threshold current; and
the output signal is based, at least in part, on one or more stored synaptic weights.

20. The apparatus of claim 19, wherein the one or more CES elements comprise a plurality of CES elements, and wherein the one or more synaptic weights are stored in one or more second CES elements of the plurality of CES elements.

21. An apparatus for an artificial neural network, the apparatus comprising a crosspoint array of a plurality of neurons, a first neuron of the plurality of neurons to comprise at least one correlated electron switch (CES) element, wherein the first neuron is adapted to:
    establish a threshold current responsive to a transition of the at least one CES element to a low impedance state of one or more low impedance states;
    transition to a high impedance state responsive to a current in the at least one CES element equaling or exceeding the threshold current; and
    accumulate currents input to the first neuron as an accumulated current and output a signal responsive to the accumulated current equaling or exceeding the threshold current.

* * * * *